United States Patent
Sanghavi et al.

(10) Patent No.: US 10,733,003 B2
(45) Date of Patent: Aug. 4, 2020

(54) COST EFFICIENT AND ON-DEMAND POOL OF RUNNING INSTANCES IN A VIRTUAL MACHINE ENVIRONMENT

(71) Applicant: salesforce.com, inc., San Francisco, CA (US)

(72) Inventors: Kunal Sanghavi, Pleasanton, CA (US); Vijaysenthil Veeriah, San Francisco, CA (US); Varun Gupta, Berkeley, CA (US); Edward David Harris, Lafayette, CA (US); Tyson Lutz, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 238 days.

(21) Appl. No.: 15/342,645

(22) Filed: Nov. 3, 2016

(65) Prior Publication Data
US 2018/0121225 A1    May 3, 2018

(51) Int. Cl.
  *G06F 9/455* (2018.01)
  *G06F 9/50* (2006.01)
  *G06F 9/52* (2006.01)

(52) U.S. Cl.
  CPC ........ *G06F 9/45558* (2013.01); *G06F 9/5077* (2013.01); *G06F 9/5083* (2013.01); *G06F 9/526* (2013.01); *G06F 2009/4557* (2013.01)

(58) Field of Classification Search
  CPC .................. G06F 9/45533–46; G06F 9/526
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

OTHER PUBLICATIONS

Principles of Transaction Processing for the System Professional Philip A. Bernstein and Eric Newcomer Chapter 6—Locking (Year: 1997).*

(Continued)

*Primary Examiner* — Emerson C Puente
*Assistant Examiner* — Paul V Mills
(74) *Attorney, Agent, or Firm* — Dergosits & Noah LLP; Todd A. Noah

(57) ABSTRACT

Pooled virtual machine load balancers are described. A system determines whether a number of virtual machine load balancers that are in a pool is less than a specified number. The system creates a calculated number of virtual machine load balancers for the pool if the number of virtual machine load balancers that are in the pool is less than the specified number, the calculated number being equal to the specified number minus the number of virtual machine load balancers that are in the pool. The system receives a request to create a virtual machine environment that requires at least one virtual machine load balancer. The system allocates a virtual machine load balancer from the pool to the virtual machine environment.

20 Claims, 8 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,449,614 B1 * | 9/2002 | Marcotte ............... G06F 9/526 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,695,079 B1 * | 4/2014 | Miller ................... H04L 63/08 709/223 |
| 9,971,621 B1 * | 5/2018 | Berg ................... G06F 9/45558 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0166206 A1 * | 7/2005 | Parson ................... G06F 9/526 718/104 |
| 2008/0288496 A1 * | 11/2008 | Duggirala ............... G06F 9/526 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0024573 A1 * | 1/2013 | Kushida ................ G06F 9/5072 709/226 |
| 2013/0055241 A1 * | 2/2013 | De ............................ G06F 8/63 718/1 |
| 2013/0081061 A1 * | 3/2013 | Dice ....................... G06F 9/52 719/314 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0156959 A1 * | 6/2014 | Heidelberger .......... G06F 5/065 711/163 |
| 2014/0173620 A1 * | 6/2014 | Chai ..................... G06F 9/5005 718/104 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0106805 A1 * | 4/2015 | Melander ............ G06F 9/45537 718/1 |

(56) References Cited

U.S. PATENT DOCUMENTS

2015/0172563 A1 6/2015 Jakobson et al.
2016/0323187 A1* 11/2016 Guzman ............... H04L 47/125

OTHER PUBLICATIONS

Neutron/LBaaS/LBaaS+and+Libra+integration+Draft https://wiki.openstack.org/wiki/Neutron/LBaaS/LBaaS%2Band%2BLibra%2Bintegration%2BDraft (Year: 2014).*
Simple, Fast, and Practical Non-Blocking and Blocking Concurrent Queue Algorithms M.M. Michael and M.L. Scott (Year: 1995).*
Writing a Generalized Concurrent Queue Herb Sutter Retrieved from: www.drdobbs.corn/parallel/writing-a-generalized-concurrent-queue/211601363 (Year: 2008).*
Oracle Berkeley DB Java Edition—Getting Started with Transaction Processing Oracle Corporation Release 3.2, p. 17-20 (Year: 2006).*
Probabilistic Models and Asymptotic Results for Concurrent Processing with Exclusive and Non-Exclusive Locks Debasis Mitra SIAM Journal on Computing, vol. 14, Issue 4, p. 1030 (Year: 1985).*
MySQL 5.6 Reference Manual Oracle Corporation revision: 60758, p. 1520-1521 Published no later than Jan. 25, 2019 (Year: 2019).*
MySQL 5.6 Reference Manual Chapter 12.14 Locking Functions; pp. 1520-1521 Precise publication date unknown, no later than Jan. 25, 2019 (Year: 2019).*
MySQL 5.0 Certification Study Guide Chapter 28.3. Advisory Locking (Year: 2006).*
How to Coordinate Distributed Work With MySQL's Get_Lock Baron Schwartz https://www.xaprb.com/blog/2006/07/26/how-to-coordinate-distributed-work-with-rnysqls-get_lock/ (Year: 2006).*
Real-time Resource Allocators in Network Processors using FIFOs Dale Parson (Year: 2004).*
Scalable Producer-Consumer Pools based on Elimination-Diffraction Trees Yehuda Afek, Guy Korland, Maria Natanzon, and Nir Shavit (Year: 2010).*
U.S. Appl. No. 13/986,251, filed Apr. 16, 2013.

* cited by examiner

Table 700:

| Subnetwork Identifier | Region | Instance Name | Pool Size |
|---|---|---|---|
| Subnet-8a40b4fc | Region 1 | BigIP | 20 |
| Subnet-bd4b98d9 | Region 2 | BigIP | 10 |

Table 702:

| # | Pool Name | Instance Identifier | Time Added | Created By | Consumed By | Time Consumed |
|---|---|---|---|---|---|---|
| 1 | Subnetwork A | i-A1 | <time stamp> | Producer A1 | Consumer A3 | <time stamp> |
| 2 | Subnetwork A | i-A5 | <time stamp> | Producer A3 | Consumer A2 | <time stamp> |
| 3 | Subnetwork A | i-A2 | <time stamp> | Producer A2 | Consumer A1 | <time stamp> |
| 4 | Subnetwork B | i-B1 | <time stamp> | Producer B2 | Consumer B3 | <time stamp> |
| 5 | Subnetwork C | i-C1 | <time stamp> | Producer C3 | Consumer C1 | <time stamp> |
| 6 | Subnetwork A | i-A3 | <time stamp> | Producer A3 | Consumer A2 | <time stamp> |
| 7 | Subnetwork B | i-B2 | <time stamp> | Producer B3 | Consumer B1 | <time stamp> |
| 8 | Subnetwork A | i-A4 | <time stamp> | Producer A1 | Consumer A3 | <time stamp> |
| 9 | Subnetwork B | i-B3 | <time stamp> | Producer B1 | Consumer B2 | <time stamp> |
| 10 | Subnetwork C | i-C2 | <time stamp> | Producer C1 | Consumer C2 | <time stamp> |

FIG. 7

COST EFFICIENT AND ON-DEMAND POOL OF RUNNING INSTANCES IN A VIRTUAL MACHINE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A virtual machine can be a software implementation of a computer that executes programs like a physical machine. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, known as hardware virtualization, the key to a cloud computing environment. Server virtualization has proven to be a highly effective technology in many enterprises, and is a key element enabling cloud and information technology as a service offering.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 7 illustrates example database tables for pooled virtual machine load balancers, in an embodiment.

DETAILED DESCRIPTION

General Overview

Figure 1:
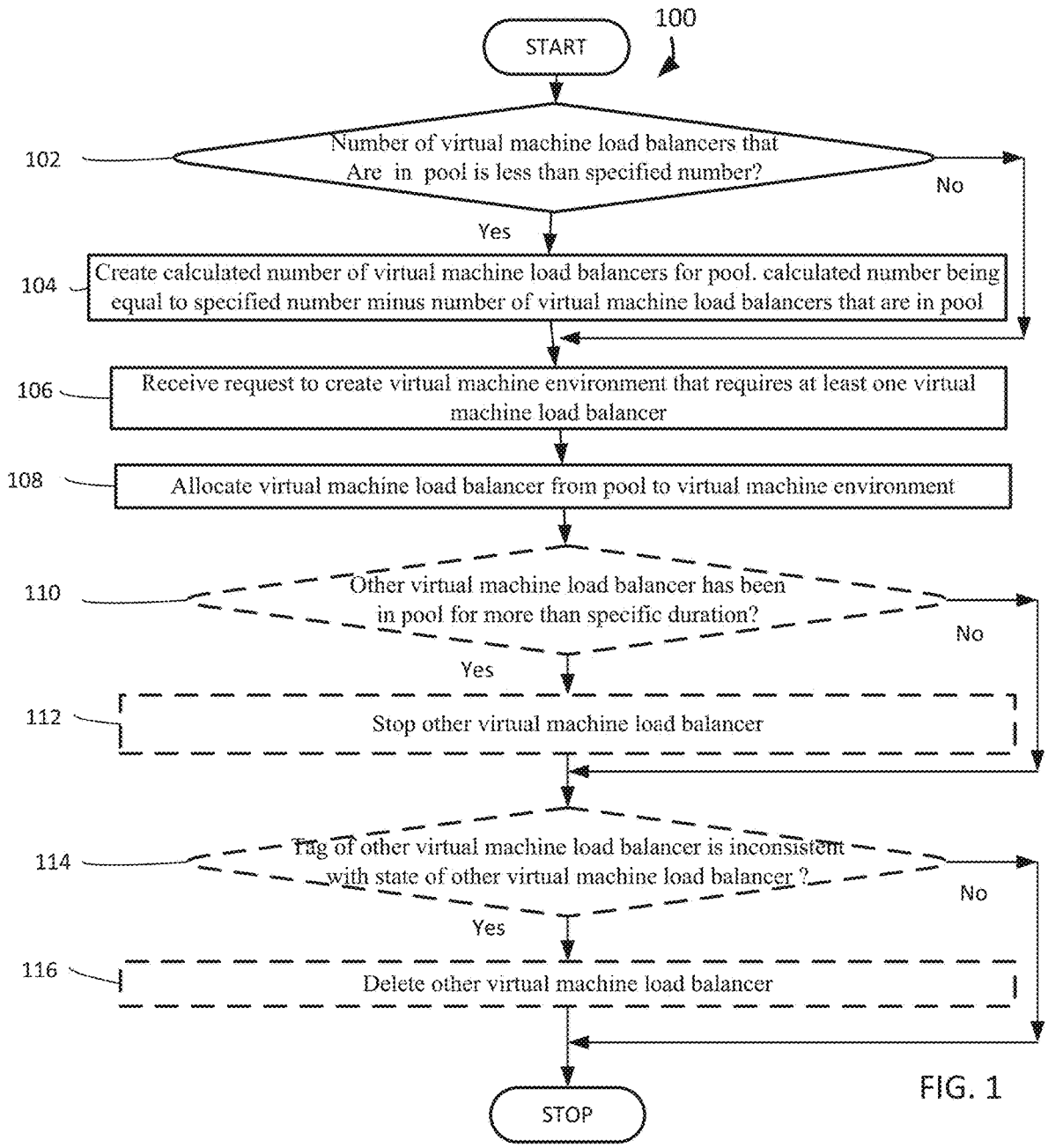
FIG. 1 depicts an operational flow diagram illustrating a high level overview of a method for pooled virtual machine load balancers, in an embodiment.

Cloud computing can be a type of Internet-based computing that provides shared computer processing resources and data to computers and other devices on demand. Cloud computing may be used as a model for enabling ubiquitous, on-demand access to a shared pool of configurable computing resources (such as computer networks, servers, storage, applications, and services), that can be rapidly provisioned and released with minimal management effort. Cloud computing and storage solutions can provide users and enterprises with various capabilities to store and process their data in third-party data centers that may be located far from the user-ranging in distance from across a city to across the world. Cloud computing can rely on sharing of resources to achieve coherence and economy of scale. An enterprise can use cloud computing to scale up as computing needs increase and then scale down again as computing demands decrease.

An end user can use a client device to request the creation of a virtual machine environment, which may be created in a cloud computing environment or any other computing environment that enables the creation of a requested virtual machine environment. A virtual machine environment can be the overall structure within which an emulated computer operates. Examples of virtual machine environments include a single virtual machine and include multiple virtual machines that function as a load balancer, two or more application servers, a database server, and a storage server.

The creation of virtual machines for different purposes may require significantly different amounts of time. For example, the creation of application servers, database servers, and storage servers may require less than 8 minutes for these virtual machines to reach "running" state, while the creation of a load balancer may require more than 20 minutes for the load balancer to reach running state. Consequently, if an end user requests the creation of a virtual machine environment that includes a load balancer, the time required to create the load balancer can result in a delay in the creation of the requested virtual machine environment. Such a delay can result in the failure of the creation of the requested virtual machine environment within a required time period. Even if the request does not fail, already created virtual machines that depend on a running load balancer may be forced to wait idly while the load balancer is being created.

In accordance with embodiments described herein, there are provided methods and systems for pooled virtual machine load balancers. A determination is made whether a number of virtual machine load balancers that are in a pool are less than a specified number. A calculated number of virtual machine load balancers is created for the pool if the number of virtual machine load balancers that are in the pool is less than the specified number, the calculated number being equal to the specified number minus the number of virtual machine load balancers that are in the pool. A request to create a virtual machine environment that requires at least one virtual machine load balancer is received. A virtual machine load balancer is allocated from the pool to the virtual machine environment.

For example, a system determines whether the 4 virtual machine load balancers that are in subnetwork A's pool is less than the required number of 5 virtual machine load balancers for subnetwork A. The system creates 1 virtual machine load balancer for subnetwork A's pool because the 4 virtual machine load balancers that are in subnetwork A's pool is 1 less than the required number of 5 for subnetwork A. The system receives a request to create a virtual machine environment in subnetwork A, and the requested virtual machine environment requires 1 virtual machine load balancer to balance the load for 2 virtual machine application servers. The system allocates 1 of the 5 virtual machine load balancers from subnetwork A's pool to the requested virtual machine environment. By creating and maintaining a pool of virtual machine load balancers prior to receiving a request to create a virtual machine environment that requires one of the virtual machine load balancers, the system provides a pre-created virtual machine load balancer in response to the request, thereby significantly reducing the possibilities of request failures and delays.

Methods and systems are provided for pooled virtual machine load balancers. First, a method for pooled virtual machine load balancers will be described with reference to example embodiments. Next, a mechanism for pooled virtual machine load balancers will be described. Then the following detailed description will describe multiple methods for pooled virtual machine load balancers.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for pooled virtual machine load balancers. The method 100 may be implemented on either a centralized computing platform or in parallel on a distributed computing platform.

A determination is made whether a number of virtual machine load balancers that are in a pool is less than a specified number, box 102. The system maintains a specified number of virtual machine load balancers in a pool by verifying how many virtual machine load balancers are available in the pool. For example and without limitation, this can include the system's arbitrator component for subnetwork A dispatching one of the system's producer components for subnetwork A to determine whether the 4 virtual machine load balancers that are in subnetwork A's pool is less than the required number of 5 virtual machine load balancers for subnetwork A's pool, as specified in a subnetwork pool size table. In another example, at system initialization, a producer component for subnetwork A determines whether the 0 virtual machine load balancers that are in subnetwork A's pool is less than the required number of 5 for subnetwork A's pool. Similarly, at system initialization, producer components for each subnetwork determine whether the number of virtual machine load balancers for each subnetwork's pool is less than the required number specified in the subnetwork pool size table.

The subnetwork pool size table can be implemented in a database such as a mysql database. This table can maintain the pool size of virtual machine load balancers in all subnetworks. The table's details can be static and cached on startup. A system administrator can change any pool size and update the cache without the need to restart any virtual machine load balancers. An example subnetwork pool size table is depicted in FIG. 7 and described below in reference to FIG. 7.

A virtual machine load balancer can be a computer emulation that distributes work across multiple computing resources. A pool can be a set of initialized computer load balancers that are kept ready for use. A specified number can be a level or amount at which virtual machine load balancers are maintained in a pool. A subnetwork can be a part of a number of interconnected computers. If the number of virtual machine load balancers that are in a pool is less than the specified number, the method continues to box 104 to replenish the pool. If the number of virtual machine load balancers that are in the pool is not less than the specified number, the method proceeds to box 106 to wait for requests to create virtual machine environments.

If the number of virtual machine load balancers that are in a pool is less than the specified number, a calculated number of virtual machine load balancers is created for the pool, the calculated number being equal to the specified number minus the number of virtual machine load balancers that are in the pool, box 104. The system maintains a specified number of virtual machine load balancers in a pool by creating virtual machine load balancers to compensate for any deficiency less than the specified number. By way of example and without limitation, this can include the arbitrator component for subnetwork A dispatching one of the system's producer components for subnetwork A to create 1 virtual machine load balancer for the subnetwork A's pool because the 4 virtual machine load balancers that are in subnetwork A's pool is 1 less than the required number of 5 for subnetwork A. In another example, at system initialization, the arbitrator component for subnetwork A dispatches multiple producer components for subnetwork A to create 5 virtual machine load balancers for subnetwork A's pool because the 0 virtual machine load balancers that are in subnetwork A's pool is 5 less than the required number of 5 for subnetwork A. Similarly, at system initialization, producer components for each subnetwork create the number of virtual machine load balancers for each subnetwork's pool that is specified in the subnetwork pool size table.

Creating the calculated number of virtual machine load balancers for a pool may include applying a write lock to the pool prior to creating the calculated number of virtual machine load balancers for the pool, and releasing the write lock from the pool after creating the calculated number of virtual machine load balancers for the pool. For example, a producer component for subnetwork A applies a write lock to subnetwork A's pool, creates the 1 virtual machine load balancer for subnetwork A's pool and releases the write lock from subnetwork A's pool. The producer component for subnetwork A applies a write lock to subnetwork A's pool to prevent other producer components for subnetwork A from adding the identifier of another virtual machine load balancer to subnetwork A's pool at the same time, thereby ensuring that the pool size is maintained correctly and does not overflow its specified capacity.

System components interact with virtual machine load balancers in a pool in an atomic and consistent way. The producer component's write lock, and the consumer component's read lock that is described below, may be implemented in a mysql database: GET_LOCK( ) can be used to implement application locks or to simulate record locks. Names are locked on a server-wide basis. If a name has been locked within one session, GET_LOCK( ) blocks any request by another session for a lock with the same name. This blocking enables clients that agree on a given lock name to use the name to perform cooperative advisory locking. A lock obtained with GET_LOCK( ) is released explicitly by executing RELEASE_LOCK( ) or implicitly when a session terminates, either normally or abnormally. A producer component can use WRITE_<Subnet_Id> lock to ensure atomicity of its operations to maintain a pool's size. A consumer component can use READ_<Subnet_Id> lock to ensure that the same virtual machine load balancer is not allocated to multiple requestors.

Creating a calculated number of virtual machine load balancers for a pool can include modifying the tag of a virtual machine load balancer to being available in the pool. For example, after creating a virtual machine load balancer for subnetwork A's pool, a producer component for subnetwork A modifies the tag of the virtual machine load balancer to being 'IN-POOL' (available in the pool). A producer component tags virtual machine load balancers to enable tracking of these load balancers, and to enable a reaper component to delete load balancers that are associated with errors, as described below. A reaper can be a background process that deletes or terminates a virtual machine load balancer that is tagged as failed or no longer in use.

Having maintained a pool of virtual machine load balancers, a request to create a virtual machine environment that requires at least one virtual machine load balancer is received, box 106. In embodiments, this can include the system's arbitrator component for subnetwork A receiving a request to create a virtual machine environment in subnetwork A, and the requested virtual machine environment requires 1 virtual machine load balancer to balance the load for 2 virtual machine application servers. A request to create a virtual machine environment can be an instruction from a client device to emulate a computer based on certain configurations.

In response to the request to create a virtual machine environment, a virtual machine load balancer is allocated from a pool to the virtual machine environment, box 108. For example and without limitation, this can include the system's arbitrator component for subnetwork A dispatching one of the system's consumer components for subnetwork A to allocate the next available virtual machine load balancer of the 5 virtual machine load balancers from subnetwork A's pool to the virtual machine environment that requires 1 virtual machine load balancer to balance the load for multiple virtual machine application servers. The dispatched consumer component returns the identifier of the next available virtual machine load balancer to the requestor. By creating and maintaining a pool of virtual machine load balancers prior to receiving a request to create a virtual machine environment that requires a virtual machine load balancer, the system provides a pre-created virtual machine load balancer in response to the request, thereby significantly reducing the possibilities of request failures and delays.

The arbitrator component for a subnetwork also dispatches a producer component for the subnetwork to replenish the subnetwork's pool with another virtual machine load balancer, thereby maintaining the size of each subnetwork's pool at each pool's corresponding specified number of virtual machine load balancers. The arbitrator component for a subnetwork dispatches a producer component for the subnetwork to replenish the subnetwork's pool with another virtual machine load balancer rather than reclaiming a virtual machine load balancer that is no longer being used by a virtual machine environment. Since a virtual machine environment can terminate the use of a virtual machine load balancer at any time, the system cannot depend upon reclaiming a virtual machine load balancer to maintain a pool size. Furthermore, a requestor may have significantly modified a virtual machine load balancer or written confidential data to the virtual machine load balancer, either of which would result in the virtual machine load balancer not being appropriate for reuse.

Allocating a virtual machine load balancer from a pool to a virtual machine environment can include applying a read lock to the pool prior to allocating the virtual machine load balancer from the pool to the virtual machine environment, and releasing the read lock from the pool after allocating the virtual machine load balancer from the pool to the virtual machine environment. For example, a consumer component for subnetwork A applies a read lock to subnetwork A's pool, allocates 1 virtual machine load balancer from subnetwork A's pool to the virtual machine environment that requires a virtual machine load balancer, and releases the read lock from subnetwork A's pool. The consumer component for a subnetwork applies a read lock to the subnetwork's pool to prevent other consumer components for the subnetwork from reading the identifier of the next available virtual machine load balancer in the subnetwork's pool, thereby ensuring that the next available virtual machine load balancer in the subnetwork's pool is allocated to only one requestor, which may be referred to as an "exactly once" allocation of a load balancer. Since a producer component for a subnetwork's pool uses a write lock that differs from the read lock used by a consumer component for the same subnetwork's pool, both a producer component and a consumer component can access the same subnetwork's pool simultaneously, because the producer component's applied write lock does not prevent the consumer component from accessing the subnetwork's pool, and the consumer component's applied read lock does not prevent the producer component from accessing the subnetwork's pool.

Allocating a virtual machine load balancer from a pool to a virtual machine environment can also include modifying the tag of the virtual machine load balancer from being available in the pool to being allocated for use. For example, before assigning a virtual machine load balancer to a virtual machine environment, a consumer component modifies the tag of the virtual machine load balancer from being 'IN-POOL' (available in the pool) to being 'IN-USE' (allocated to a requestor for use). Allocating a virtual machine load balancer to a virtual machine environment can be distributing or assigning an asset to a computer emulation for a specific purpose.

The pool can be implemented as a queue that uses a database table or a queue service. An example of a pool that is implemented by database table that functions as a queue of virtual machine load balancers is depicted by FIG. 7 and described below in reference to FIG. 7. Such a database table can provide all of the atomicity, consistency, isolation, and durability transactional properties of database management systems, and store the information for each pool for each subnetwork in a single data structure. Even if the single database table stores the information for a significantly large number of pools, access time for such a large data structure can be improved by clustering pool information. Alternatively, the pool can be implemented as a queue that uses a queue service, such as Amazon Simple Queue Service, which would require a separate queue for each subnetwork. Since a queue service such as Amazon Simple Queue Service can redeliver a message more than once, such a queue service may require that applications such as the producer component and the consumer component be idempotent, which is a requirement that an application must not be adversely affected by processing the same message more than once. The pool may be implemented as a FIFO (first in, first out) queue or as a LIFO (last in, first out) queue.

Following the creation of virtual machine load balancers in the pool, a determination is optionally made whether another virtual machine load balancer has been in the pool for more than a specific duration, box 110. Checking on virtual machines' duration in a pool reduces costs for virtual machine load balancers that have created but not allocated for some time. By way of example and without limitation, this can include the system's sleeper component for subnetwork A waking up after 20 minutes and determining if any of the virtual machine load balancers has been in subnetwork A's pool for more than 30 minutes. If the other virtual machine load balancer has been in the pool for more than the specific duration, the method 100 continues to block 112 to stop the other virtual machine load balancer. If the other virtual machine load balancer has not been in the pool for more than the specific duration, the method 100 proceeds to block 114. A specific duration can be an amount of processing cycles or a time period. Although FIG. 1 depicts the system executing box 110 after box 108, the system can execute box 110 before executing box 108 or simultaneously with executing box 108.

If the other virtual machine load balancer has been in a pool for more than the specific duration, then the other virtual machine load balancer is optionally stopped, box 112. Stopping long-idling virtual machine load balancers reduces costs for these virtual machine load balancers that have created but not allocated for some time. In embodiments, this can include the system's sleeper component for subnetwork A stopping the virtual machine load balancer that has been in subnetwork A's pool for more than 30 minutes. Stopping a virtual machine load balancer can be powering off a computer emulation, such that the computer emulation could quickly be powered back on if the need arises.

Once virtual machine load balancers are created in a pool, a determination is optionally made whether the tag of another virtual machine load balancer is inconsistent with the state of the other virtual machine load balancer, box 114. Verifying that different sources of information about a virtual machine load balancer are consistent enables the identification of unforeseen errors. For example and without limitation, this can include the system's reaper component for subnetwork A determining whether a virtual machine load balancer that is tagged as 'IN-POOL' is actually listed as an available virtual machine load balancer in subnetwork A's pool. A tag of a virtual machine load balancer can be a label or identifier attached to or associated with an asset for computer emulation.

A state of a virtual machine load balancer can be a particular condition of an asset for computer emulation at a specific point in time. An inconsistency between the tag of a virtual machine load balancer and the state of the virtual machine load balancer can occur when a label or identifier attached to or associated with an asset for computer emulation does not accurately describe a particular condition of the asset for computer emulation at a specific point in time. Examples of other inconsistencies identified by a reaper component include a tag indicating use by a requester when the virtual machine load balancer lacks an identifier associated with the requestor, the inability to identify the tag indicating that a virtual machine load balancer is in a pool when the identifier of the virtual machine load balancer is in the pool, and any untagged virtual machine load balancers.

Although FIG. 1 depicts the system executing box 114 after box 112, the system can execute box 114 before executing box 112 or simultaneously with executing box 112.

If the tag of the other virtual machine load balancer is inconsistent with the state of the other virtual machine load balancer, then the other virtual machine load balancer is optionally deleted, box 116. Deleting specifically identified virtual machine load balancers enables the correction of certain unforeseen errors. By way of example and without limitation, this can include the system's reaper component for subnetwork A deleting a virtual machine load balancer that is tagged as 'IN-POOL' but is not listed as an available virtual machine load balancer in subnetwork A's pool.

In addition to the functions of the sleeper components and the reaper components, the system can use other means to monitor the health of each pool. For example, the system can trigger an alarm to a system administrator if any subnetwork's pool is empty for too long or overflowing its specified capacity. If the healthy host count, the number of functioning virtual machine application servers behind a virtual machine load balancer, is less than a certain number, then the system can trigger an alarm to a system administrator.

The system can also use a thread deadlock detection to determine if any threads are deadlocked. This thread deadlock detection is applicable to all components of the system, including arbitrators, producers, consumers, sleepers, and reapers.

Additionally, the system can trigger an alarm to a system administrator if a consumer component waits too long for a virtual machine load balancer and/or identifies an empty pool, which may occur during a high demand scenario.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

Figure 2:
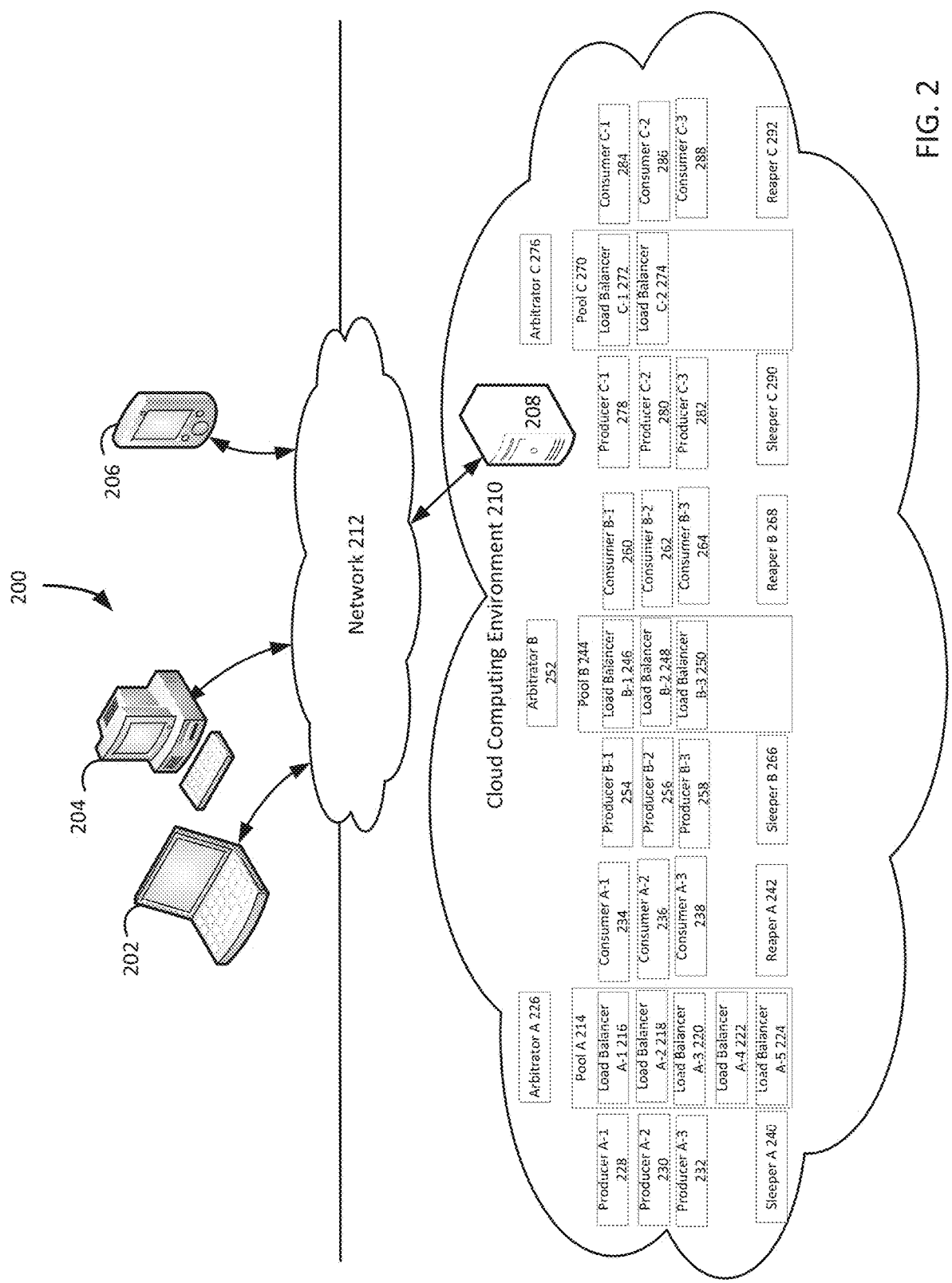
FIG. 2 depicts an example system for pooled virtual machine load balancers, in an embodiment.

FIG. 2 illustrates a diagram of an example system for pooled virtual machine load balancers, under an embodiment. As shown in FIG. 2, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 in a cloud computing environment 210 which may be provided by a hosting company. Although FIG. 2 depicts the first client 202 as a laptop computer 202, the second client 204 as a personal computer 204, and the third client 206 as a personal digital assistant 206, each of the clients 202-206 may be any type of computer, such as a server. The clients 202-206 and the server 208 communicate via a network 212. Although FIG. 2 depicts the system 200 with three clients 202-206, one server 208, one cloud computing environment 210, and one network 212, the system 200 may include any number of clients 202-206, any number of servers 208, any number of cloud computing environments 210, and any number of networks 212. The clients 202-206 and the server 208 may each be substantially similar to the system 800 depicted in FIG. 8 and described below.

The system 200 also includes a pool A 214 that contains a load balancer A-1 216, a load balancer A-2 218, a load balancer A-3 220, a load balancer A-4 222, and a load balancer A-5 224. The pool A 214 is accessed by an arbitrator A 226 via a producer A-1 228, a producer A-2 230, a producer A-3 232, a consumer A-1 234, a consumer A-2 236, and a consumer A-3 238. The load balancers 216-224 are accessed by a sleeper A 240 and a reaper A 242. The system 200 further includes a pool B 244 that contains a load balancer B-1 246, a load balancer B-2 248, and a load balancer B-3 250. The pool B 244 is accessed by an arbitrator B 252 via a producer B-1 254, a producer B-2 256, a producer B-3 258, a consumer B-1 260, a consumer B-2 262, and a consumer B-3 264. The load balancers 246-250 are accessed by a sleeper B 256 and a reaper B 258. The system 200 additionally includes a pool C 270 that contains a load balancer C-1 272 and a load balancer C-2 274. The pool C 270 is accessed by an arbitrator C 276 via a producer C-1 278, a producer C-2 280, a producer C-3 282, a consumer C-1 284, a consumer C-2 286, and a consumer C-3 288. The load balancers 272-274 are accessed by a sleeper C 290 and a reaper C 292.

FIG. 2 depicts the system 200 as including three pools 214, 244, and 270, ten load balancers 216-224, 246-250, and 272-274, nine producers 228-232, 254-258, and 278-282, nine consumers 234-238, 260-264, and 284-288, three sleepers 240, 266, and 290, and three reapers 242, 268, and 292. However, the system 200 can include any number of pools 214, 244, and 270, any number of load balancers 216-224, 246-250, and 272-274, any number of producers 228-232, 254-258, and 278-282, any number of consumers 234-238, 260-264, and 284-288, any number of sleepers 240, 266, and 290, and any number of reapers 242, 268, and 292. Although FIG. 2 depicts the system 200 as including three pools 214, 244, and 270 that correspond to subnetwork A, subnetwork B, and subnetwork C, the system can include any number of pools 214, 244, and 270 that correspond to any number of subnetworks. Each subnetwork can be a part of a larger network, with each subnetwork corresponding to a range of internet protocol addresses, specific functions, particular names, certain types, or any other grouping. Although FIG. 2 depicts the system as including five different types of components, the functions of an arbitrator component, a producer component, a consumer component, a sleeper component, and a reaper component can be combined into fewer system components or divided into more system components. Moreover, although FIG. 2 depicts the system 200 as creating virtual machine load balancers and virtual machine environments in the cloud computing environment 210, the system can create virtual machine load balancers and virtual machine environments in other types of computing environments.

Figure 3:
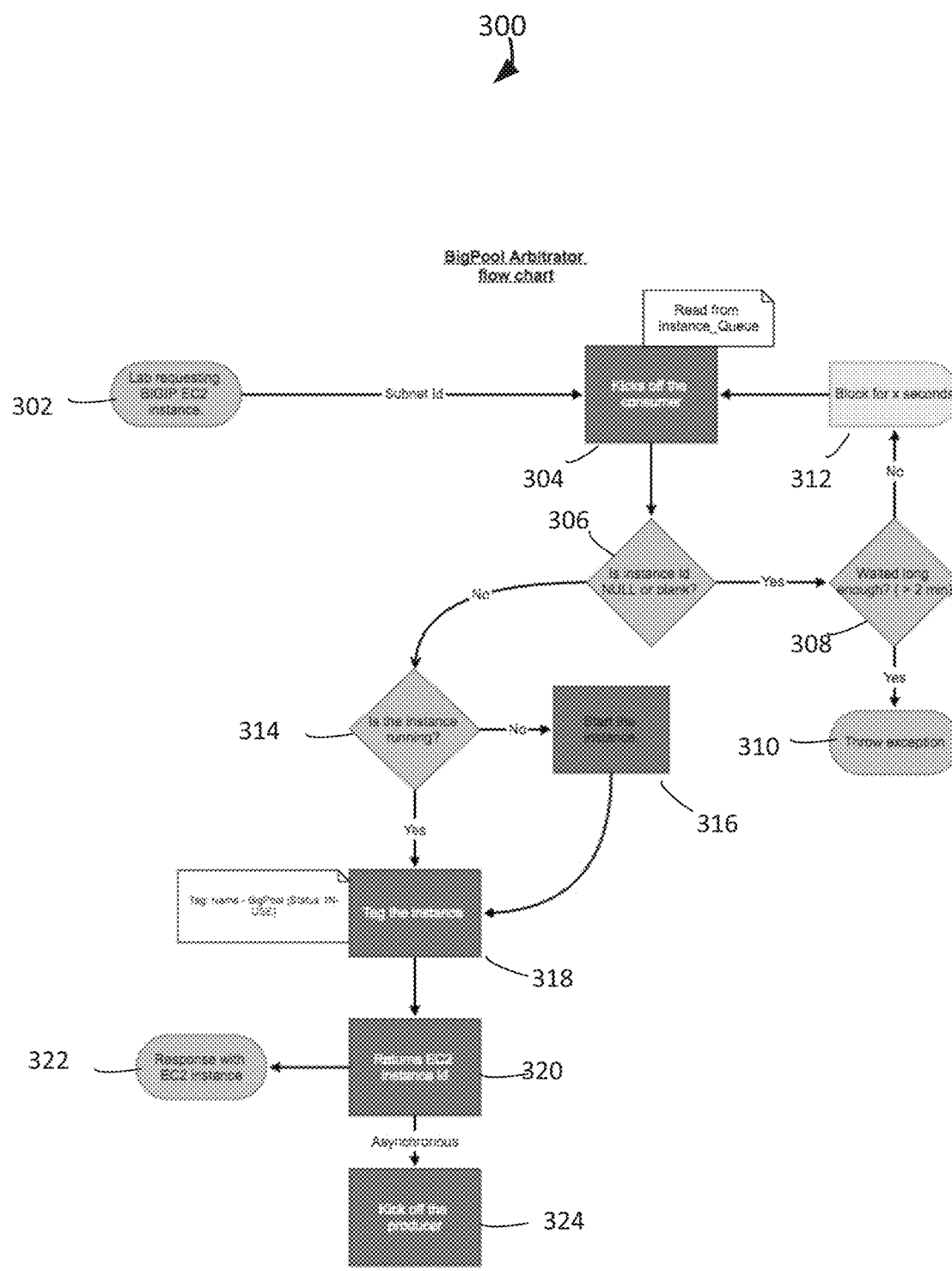
FIG. 3 depicts an operational flow diagram illustrating a high level overview of another method for pooled virtual machine load balancers, in an embodiment.

FIG. 3 depicts an operational flow diagram illustrating a high level overview of a method 300 for an arbitrator component, such as the arbitrator A 226 component, for pooled virtual machine load balancers. The arbitrator A 226 component starts by receiving a request to create a lab that requires a Big IP EC2 instance, block 302. A lab can be the name that Amazon Web Services, a cloud computing service, uses to refer to a virtual machine environment. A Big IP EC2 instance can be a virtual machine load balancer for an Amazon Elastic Compute Cloud, a commercial web service for hosting computer applications.

In response to the request to create a lab that requires a Big IP EC2 instance, the arbitrator A 226 component kicks off the consumer A-1 234 component to read from the instance queue, block 304. The instance queue can be a virtual machine load balancer pool, such as pool A 214. After the consumer A-1 234 component returns an instance identifier from the instance pool, the arbitrator A 226 component determines whether the instance identifier is null or blank, block 306. An instance identifier can uniquely identify an instance of a virtual machine load balancer. If the instance identifier is null or blank, the arbitrator A 226 component determines whether it has waited long enough, such as more than 2 minutes, for the consumer A-1 234 component to return a valid instance identifier, block 308. If it has waited long enough, the arbitrator A 226 component throws an exception, block 310, and then terminates the method 300. An exception can cause an error message to be output to a system administrator. If it has not waited long enough, the arbitrator A 226 component blocks for some seconds, block 312. After blocking for some seconds, the arbitrator A 226 component returns to block 304 to kick off the consumer component to read from the instance queue again. If the instance id is not null or blank, the arbitrator A 226 component determines whether the instance is running, block 314. If the instance is not running, the arbitrator A 226 component starts the instance, block 316. If the instance is running, the arbitrator A 226 component tags the instance with the tag name Big Pool (Status IN-USE), block 318. After tagging a running instance, the arbitrator A 226 component returns the instance identifier to the requestor, block 320. The arbitrator A 226 component responds with an EC2 instance, block 322, and asynchronously kicks off a producer component to replenish the depleted instance queue, block 324.

Figure 4:
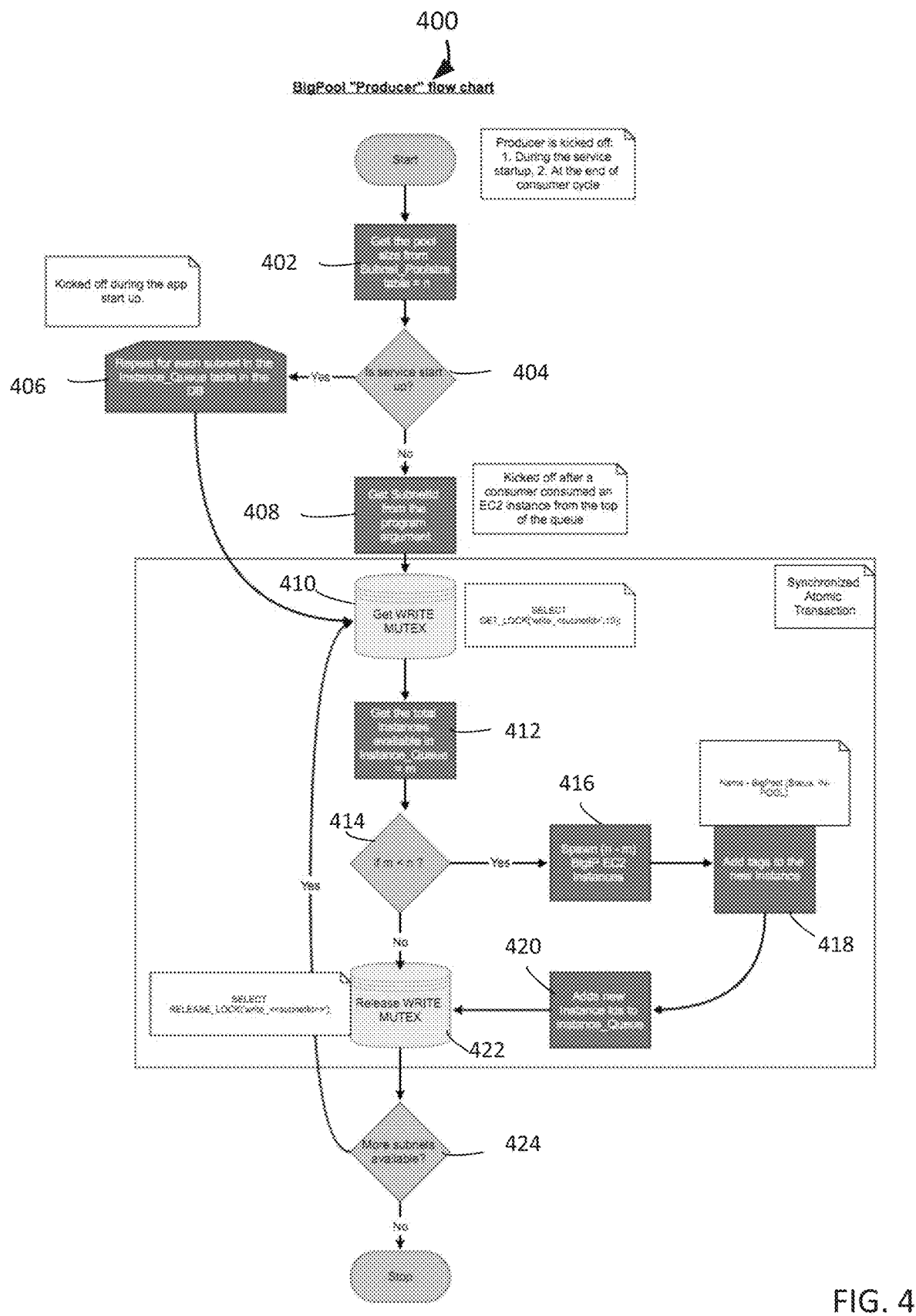
FIG. 4 depicts an operational flow diagram illustrating a high level overview of yet another method for pooled virtual machine load balancers, in an embodiment.

FIG. 4 depicts an operational flow diagram illustrating a high level overview of a method 400 for a producer component, such as the producer A-1 228 component, for pooled virtual machine load balancers. Either during service startup or at the end of a consumer cycle, the producer A-1 228 component gets the pool size from the subnetwork pool size table, block 402. Then the producer A-1 228 component determines whether service is starting up, block 404. If service is starting up, the producer A-1 228 component requests the subnetwork identifier for each subnetwork in the instance queue table in the database, block 406, after which the method 400 proceeds to block 410. The instance queue table can be a subnetwork pool size table, such as depicted by FIG. 7 and described below in reference to FIG. 7.

If service is not starting up, the producer A-1 228 component gets the subnetwork identifier from the program argument, because a consumer has just consumed an EC2 instance from the top of the instance queue, block 408. Using a subnetwork identifier, the producer A-1 228 component gets a write mutex, block 410. A write mutex can be a mutual exclusion write lock for a subnetwork's pool, as described above. When write exclusion has been ensured for the instance queue, the producer A-1 228 component gets the total instances available from the instance queue, block 412. After getting the total instances available from the instance queue, the producer A-1 228 component determines whether the total instances available in the current instance queue is less than the subnetwork pool size, block 414. If the total instances available is less than the subnetwork pool size, the producer A-1 228 component spawns the number of Big IP EC2 instances so that the total instances available in the current instance queue is no longer less than the subnetwork pool size, block 416. Having spawned any new instances, the producer A-1 228 component adds tags to the new instances, block 418. After tagging any new instances, the producer A-1 228 component adds the new instance identifiers to the instance queue, block 420. If the total instances available is not less than the subnetwork pool size, the producer A-1 228 component releases the write mutex, block 422. Once the write mutex is released, the producer A-1 228 component determines whether more subnetworks are available for possible pool replenishment, block 424. If more subnetworks are available for possible pool replenishment, the method 400 returns to block 410 to get a write mutex for the next subnetwork to have its pool checked.

Figure 5:
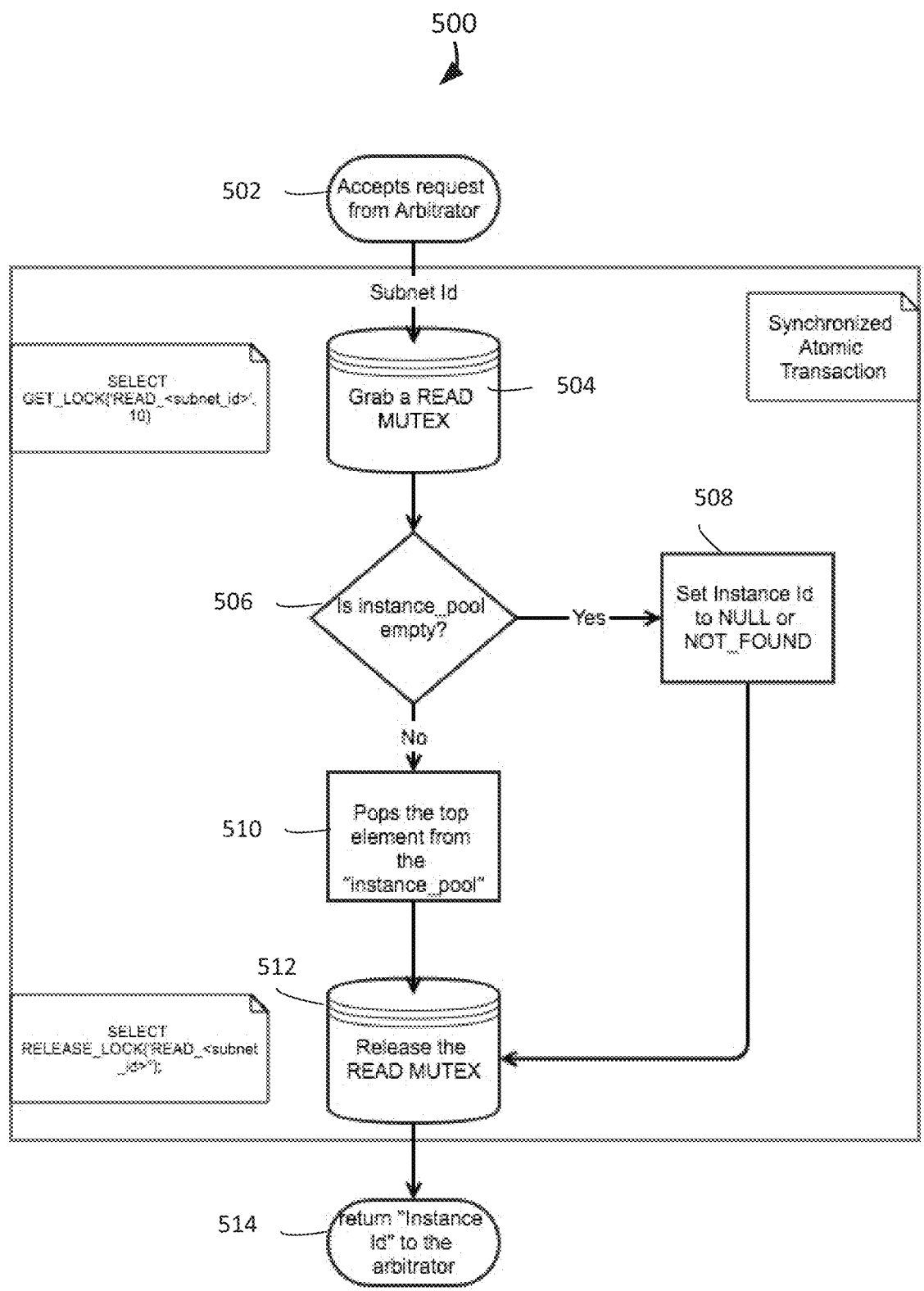
FIG. 5 depicts an operational flow diagram illustrating a high level overview of a further method for pooled virtual machine load balancers, in an embodiment.

FIG. 5 depicts an operational flow diagram illustrating a high level overview of a method 500 for a consumer component, such as the consumer A-1 234 component, for pooled virtual machine load balancers. The consumer A-1 234 component starts by accepting a request from the arbitrator A 226 component to read an instance from an instance queue, block 502. In response to the request, the consumer A-1 234 component grabs a read mutex for the arbitrator-specified instance queue, block 504. A read mutex can be a mutual exclusion write lock for a subnetwork's pool, as described above. When a mutually exclusive read has been ensured, the consumer A-1 234 component determines whether the instance pool is empty, block 506. If the instance pool is empty, the consumer A-1 234 component sets the instance identifier to null or not found, block 508, after which the method 500 proceeds to block 512. If the instance pool is not empty, the consumer A-1 234 component pops the top element from the instance pool, block 510. The top element can be the next available virtual machine load balancer. Having read from the instance pool, the consumer A-1 234 component releases the read mutex for the instance pool, block 512. After releasing the read mutex, the consumer A-1 234 component returns the instance identifier to the arbitrator A 226 component, block 514.

Figure 6:
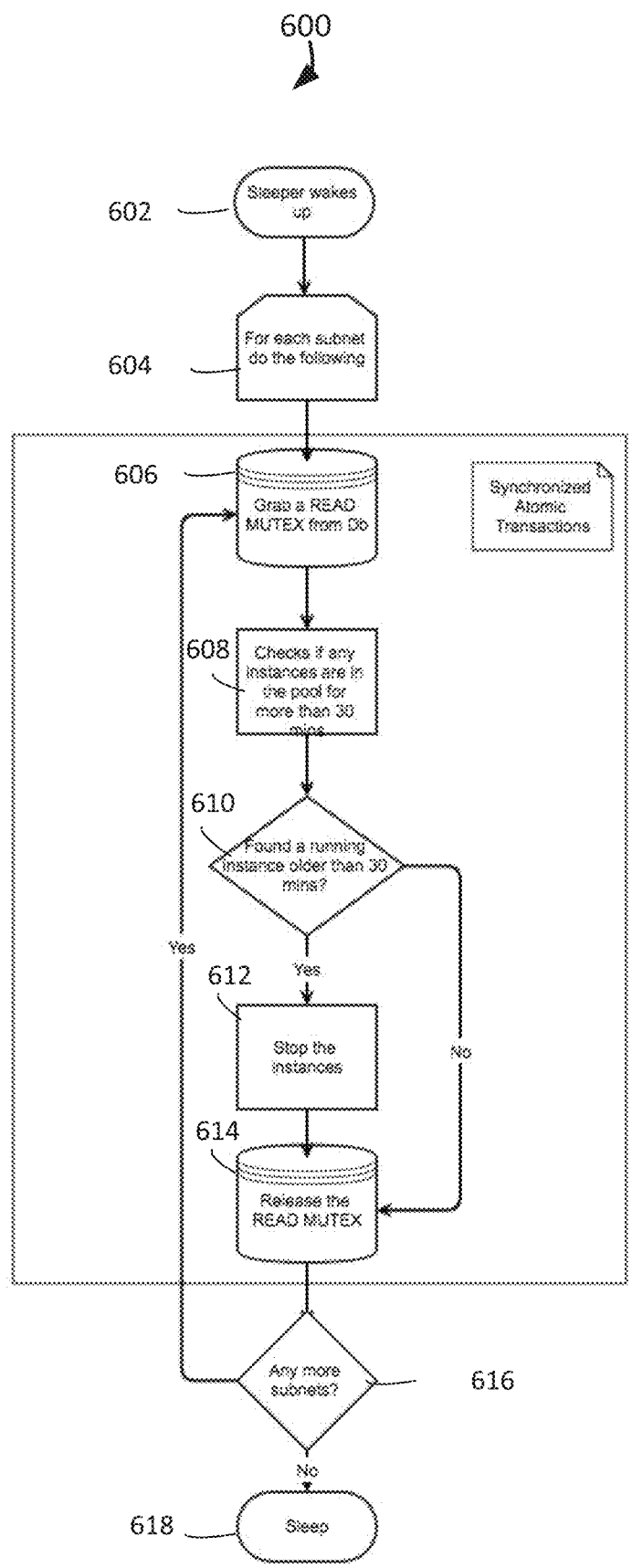
FIG. 6 depicts an operational flow diagram illustrating a high level overview of an additional method for pooled virtual machine load balancers, in an embodiment.

FIG. 6 depicts an operational flow diagram illustrating a high level overview of a method 600 for a sleeper component, such as the sleeper A 240 component, for pooled virtual machine load balancers. The sleeper A 240 component starts by waking up, such as after a 20 minute wait, block 602. Then the sleeper A 240 component executes the following blocks 606 to 614 for each subnetwork, block 604. The sleeper A 240 component grabs a read mutex for a subnetwork pool that is listed in the database, block 606. When a mutually exclusive read is insured for the subnetwork pool, the sleeper A 240 component checks if any instances are in the pool for more than 30 minutes, block 608. The sleeper A 240 component determines whether it found a running instance that is older than 30 minutes, block 610. If no running instance older than 30 minutes is found, the method 600 proceeds to block 614 to release the read mutex for the pool. If a running instance older than 30 minutes is found, the sleeper A 240 component stops the instance, block 612. After checking the pool for old instances, the sleeper A 240 component releases the read mutex, block 614. Having checked one subnetwork pool for old instances, the sleeper A 240 component determines whether there are any more subnetwork pools to check, block 616.

FIG. 7 depicts example database tables for pooled virtual machine load balancers, under an embodiment. Example database table 700 depicts a subnetwork pool size table, while example database table 702 depicts a database table that functions as a queue of virtual machine load balancers. The table 700 depicts a mysql database table that can maintain the pool size of virtual machine load balancers in all subnetworks. The table's details can be static and cached on startup. A system administrator can change any pool size and update the cache without the need to restart any virtual machine load balancers. In this example, the average number of Internet Protocol addresses allocated to a virtual machine environment is about 20. An ideal size for a subnetwork pool can be the number of Internet Protocol addresses available in a subnetwork divided by 20.

The table 702 can provide all of the atomicity, consistency, isolation, and durability transactional properties of database management systems, and store the information for each pool for each subnetwork in a single data structure. Even if the single database table 702 stores the information for a significantly large number of pools, access time for such a large data structure can be improved by clustering pool information. The table 702 implements multiple virtual machine load balancer pools in a single database table. One column or combination of columns (composite keys) can hold a reference for a virtual machine load balancer pool. Each record in the table 702 is a reference to a virtual machine load balancer within that virtual machine load balancer pool, which is beneficial if the number of virtual machine load balancer pools is dynamic in response to the changing availability of subnetworks. Table 702 is based on FIG. 2, which depicts 5 instances of virtual machine load balancers in pool A 214, 3 instances of virtual machine load balancers in pool B 244, and 2 instances of virtual machine load balancers in pool C 270. Therefore, the table 702 pools instances in 3 virtual machine load balancer pools in a multi-pool. Each virtual machine load balancer in the multi-pool is defined by its subnetwork. The multi-pool represents 3 virtual machine load balancer pools specified by their subnetworks, subnetwork A, subnetwork B, and subnetwork C.

Figure 8:
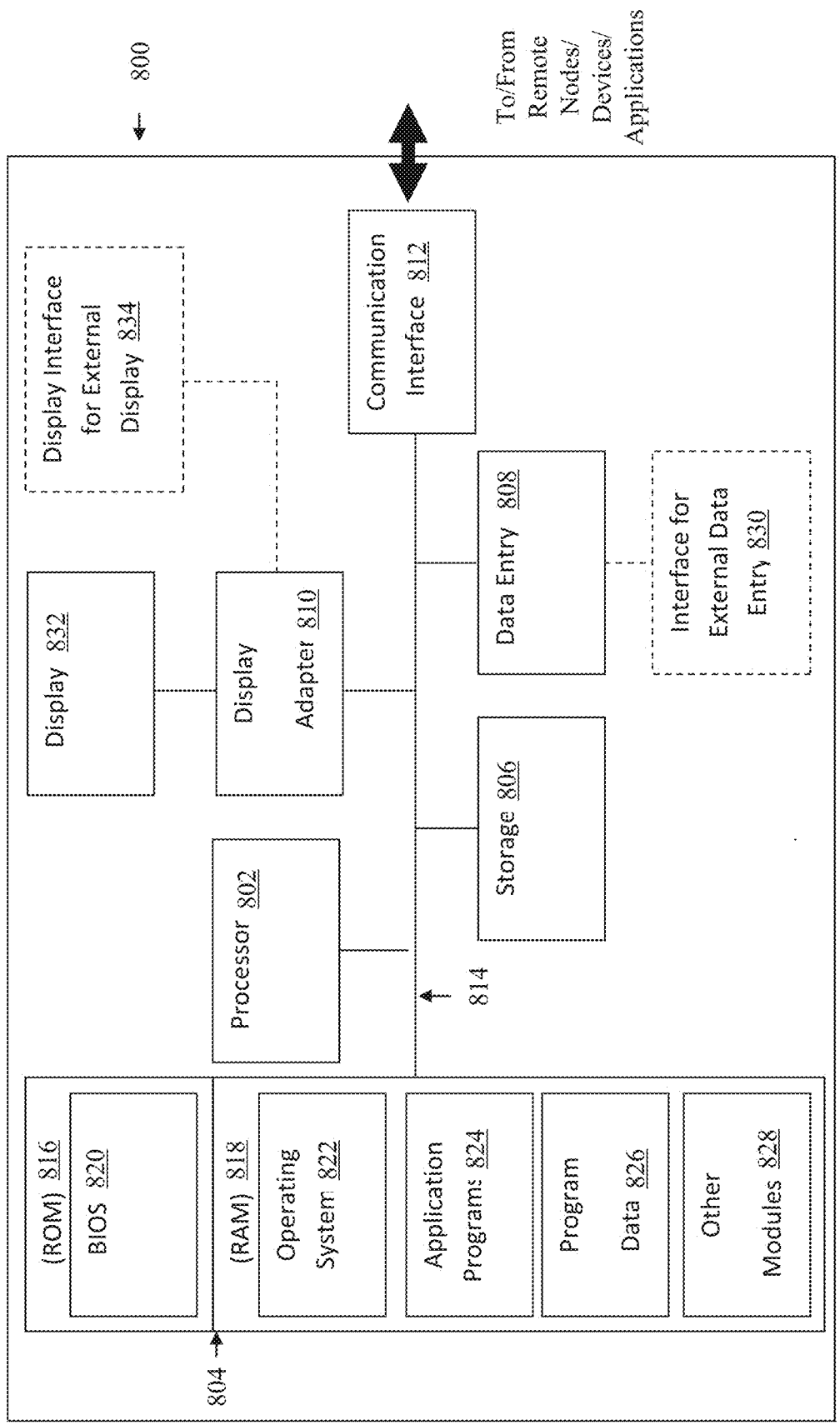
FIG. 8 is a block diagram illustrating an example hardware device in which the subject matter may be implemented.

Producers and consumers in each pool can read/write in a thread-safe and atomic manner. Producers for instances of virtual machine load balancers in subnetwork A are guarded by a mutex (subnet-a-producer) so that only one producer can add to subnetwork A's pool at a time, which ensures that the pool never goes over its specified capacity. Consumers for instances of virtual machine load balancers in subnetwork A are guarded by a separate mutex (subnet-a-consumer) so that each instance of a virtual machine load balancer in subnetwork A is allocated only once, which is called "exactly once" delivery. Each pool can be treated as a FIFO (first in, first out) queue, in which the oldest virtual machine load balancer is consumed first. Each pool in the multi-pool is logically independent of each other pool. Other implementations of the database table 702 can involve using a LIFO (last in, first out) queue or a stack-based approach to add and remove virtual machine load balancers from a pool.
System Overview Having describing the subject matter in detail, an exemplary hardware device in which the subject matter may be implemented shall be described. Those of ordinary skill in the art will appreciate that the elements illustrated in FIG. 8 may vary depending on the system implementation. With reference to FIG. 8, an exemplary system for implementing the subject matter disclosed herein includes a hardware device 800, including a processing unit 802, memory 804, storage 806, a data entry module 808, a display adapter 810, a communication interface 812, and a bus 814 that couples the elements 804-812 to the processing unit 802.

The bus 814 may comprise any type of bus architecture. Examples include a memory bus, a peripheral bus, a local bus, etc. The processing unit 802 is an instruction execution machine, apparatus, or device and may comprise a microprocessor, a digital signal processor, a graphics processing unit, an application specific integrated circuit (ASIC), a field programmable gate array (FPGA), etc. The processing unit 802 may be configured to execute program instructions stored in the memory 804 and/or the storage 806 and/or received via the data entry module 808.

The memory 804 may include read only memory (ROM) 816 and random access memory (RAM) 818. The memory 804 may be configured to store program instructions and data during operation of the hardware device 800. In various embodiments, the memory 804 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 4804 may also include nonvolatile memory technologies such as nonvolatile flash RAM (NVRAM) or ROM. In some embodiments, it is contemplated that the memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in the ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 806, the ROM 816 or the RAM 818, including an operating system 822, one or more applications programs 824, program data 826, and other program modules 828. A user may enter commands and information into the hardware device 800 through the data entry module 808. The data entry module 808 may include mechanisms such as a keyboard, a touch screen, a pointing device, etc. Other external input devices (not shown) are connected to the hardware device 800 via an external data entry interface 830. By way of example and not limitation, external input devices may include a microphone, joystick, game pad, satellite dish, scanner, or the like. In some embodiments, external input devices may include video or audio input devices such as a video camera, a still camera, etc. The data entry module 808 may be configured to receive input from one or more users of the hardware device 800 and to deliver such input to the processing unit 802 and/or the memory 804 via the bus 814.

A display 832 is also connected to the bus 814 via the display adapter 810. The display 832 may be configured to display output of the hardware device 800 to one or more users. In some embodiments, a given device such as a touch screen, for example, may function as both the data entry module 808 and the display 832. External display devices may also be connected to the bus 814 via an external display interface 834. Other peripheral output devices, not shown, such as speakers and printers, may be connected to the hardware device 800.

The hardware device 800 may operate in a networked environment using logical connections to one or more remote nodes (not shown) via the communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 812 may include logic configured to support direct memory access (DMA) transfers between the memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of the hardware device 800 illustrated in FIG. 8 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus comprising:
one or more processors; and
a non-transitory computer readable medium storing a plurality of instructions, which when executed, cause the one or more processors to:
determine, by a producer component after applying a first lock to a pool, whether a number of virtual machine load balancers that are in the pool is less than a specified number of virtual machine load balancers required to be maintained in the pool;
create, by the producer component, a calculated number of virtual machine load balancers for the pool while the first lock is applied to the pool in response to a determination that the number of virtual machine load balancers that are in the pool is less than the specified number, the calculated number being equal to the specified number minus the number of virtual machine load balancers that are in the pool, wherein the application of the first lock by the producer component prevents other producer components from performing the determining and creating;
receive, by the system, a request from a requestor to create a virtual machine environment that requires at least one virtual machine load balancer; and
allocate, by a consumer component, a virtual machine load balancer from the pool to the virtual machine environment by returning a unique identifier of the virtual machine load balancer to the requestor while a second lock is applied to the pool by the consumer component, wherein the application of the second lock by the consumer component prevents the unique identifier from being read by other consumer components.

2. The apparatus of claim 1, wherein the pool is implemented as a queue that uses one of a queue service and a database table.

3. The apparatus of claim 1, wherein the first lock is released after creating the calculated number of virtual machine load balancers for the pool.

4. The apparatus of claim 1, wherein the second lock is released from the pool after allocating the virtual machine load balancer from the pool to the virtual machine environment.

5. The apparatus of claim 1, wherein allocating the virtual machine load balancer from the pool to the virtual machine environment comprises modifying a tag of the virtual machine load balancer from being available in the pool to being allocated for use.

6. The apparatus of claim 1, comprising further instructions, which when executed, cause the one or more processors to:
determine, by the system, whether another virtual machine load balancer has been in the pool for more than a specific duration; and
stop, by the system, the other virtual machine load balancer in response to a determination that the other virtual machine load balancer has been in the pool for more than the specific duration.

7. The apparatus of claim 1, comprising further instructions, which when executed, cause the one or more processors to:
determine, by the system, whether a tag of another virtual machine load balancer is inconsistent with a state of the other virtual machine load balancer; and
delete, by the system, the other virtual machine load balancer in response to a determination that the tag of the other virtual machine load balancer is inconsistent with the state of the other virtual machine load balancer.

8. A computer program product comprising a non-transitory computer-readable medium storing computer-readable program code to be executed by one or more processors when retrieved from the non-transitory computer-readable medium, the program code including instructions to:
determine, by a producer component after applying a first lock to a pool, whether a number of virtual machine load balancers that are in the pool is less than a specified number of virtual machine load balancers required to be maintained in the pool;
create, by the producer component, a calculated number of virtual machine load balancers for the pool while the first lock is applied to the pool in response to a determination that the number of virtual machine load balancers that are in the pool is less than the specified number, the calculated number being equal to the specified number minus the number of virtual machine load balancers that are in the pool, wherein the application of the first lock by the producer component prevents other producer components from performing the determining and creating;

receive, by the system, a request from a requestor to create a virtual machine environment that requires at least one virtual machine load balancer; and allocate, by a consumer component, a virtual machine load balancer from the pool to the virtual machine environment by returning a unique identifier of the virtual machine load balancer to the requestor while a second lock is applied to the pool by the consumer component, wherein the application of the second lock by the consumer component prevents the unique identifier from being read by other consumer components.

9. The computer program product of claim 8, wherein the pool is implemented as a queue that uses one of a queue service and a database table.

10. The computer program product of claim 8, wherein the first lock is released after creating the calculated number of virtual machine load balancers for the pool.

11. The computer program product of claim 8, wherein the read second lock is released from the pool after allocating the virtual machine load balancer from the pool to the virtual machine environment.

12. The computer program product of claim 8, wherein allocating the virtual machine load balancer from the pool to the virtual machine environment comprises modifying a tag of the virtual machine load balancer from being available in the pool to being allocated for use.

13. The computer program product of claim 8, wherein the program code comprises further instructions to:

determine, by the system, whether another virtual machine load balancer has been in the pool for more than a specific duration; and stop, by the system, the other virtual machine load balancer in response to a determination that the other virtual machine load balancer has been in the pool for more than the specific duration.

14. The computer program product of claim 8, wherein the program code comprises further instructions to:

determine, by the system, whether a tag of another virtual machine load balancer is inconsistent with a state of the other virtual machine load balancer; and delete, by the system, the other virtual machine load balancer in response to a determination that the tag of the other virtual machine load balancer is inconsistent with the state of the other virtual machine load balancer.

15. A method comprising:

determining, by a producer component after applying a first lock to a pool, whether a number of virtual machine load balancers that are in the pool is less than a specified number of virtual machine load balancers required to be maintained in the pool;

creating, by the producer component, a calculated number of virtual machine load balancers for the pool while the first lock is applied to the pool in response to a determination that the number of virtual machine load balancers that are in the pool is less than the specified number, the calculated number being equal to the specified number minus the number of virtual machine load balancers that are in the pool, wherein the application of the first lock by the producer component prevents other producer components from performing the determining and creating;

receiving, by the system, a request from a requestor to create a virtual machine environment that requires at least one virtual machine load balancer; and allocating, by a consumer component, a virtual machine load balancer from the pool to the virtual machine environment by returning a unique identifier of the virtual machine load balancer to the requestor while a second lock is applied to the pool by the consumer component, wherein the application of the second lock by the consumer component prevents the unique identifier from being read by other consumer components.

16. The method of claim 15, wherein the pool is implemented as a queue that uses one of a queue service and a database table.

17. The method of claim 15, wherein the first lock is released after creating the calculated number of virtual machine load balancers for the pool.

18. The method of claim 15, wherein the second lock is released from the pool after allocating the virtual machine load balancer from the pool to the virtual machine environment, and wherein the allocating the virtual machine load balancer from the pool further comprises modifying a tag of the virtual machine load balancer from being available in the pool to being allocated for use.

19. The method of claim 15, wherein the method further comprises:

determining, by the system, whether another virtual machine load balancer has been in the pool for more than a specific duration; and stopping, by the system, the other virtual machine load balancer in response to a determination that the other virtual machine load balancer has been in the pool for more than the specific duration.

20. The method of claim 15, wherein the method further comprises:

determining, by the system, whether a tag of another virtual machine load balancer is inconsistent with a state of the other virtual machine load balancer; and deleting, by the system, the other virtual machine load balancer in response to a determination that the tag of the other virtual machine load balancer is inconsistent with the state of the other virtual machine load balancer.

* * * * *